US012626508B2

(12) United States Patent
Schroeder

(10) Patent No.: US 12,626,508 B2
(45) Date of Patent: May 12, 2026

(54) HOUSEHOLD APPLIANCE VIDEO ANALYSIS

(71) Applicant: Haier US Appliance Solutions, Inc., Wilmington, DE (US)

(72) Inventor: Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 384 days.

(21) Appl. No.: 18/347,390

(22) Filed: Jul. 5, 2023

(65) Prior Publication Data

US 2025/0014337 A1    Jan. 9, 2025

(51) Int. Cl.
*G06V 20/40* (2022.01)
*G06T 5/50* (2006.01)
*G06T 5/70* (2024.01)

(52) U.S. Cl.
CPC ............... *G06V 20/41* (2022.01); *G06T 5/50* (2013.01); *G06T 5/70* (2024.01); *G06V 20/46* (2022.01);
(Continued)

(58) Field of Classification Search
CPC ........ G06V 20/41; G06V 20/46; G06V 20/48; G06V 20/52; G06V 10/764; G06V 20/00; G06V 20/68; G06V 10/454; G06V 10/54; G06V 10/7764; G06V 10/774; G06V 10/82; G06V 10/84; G06V 30/18057; G06V 20/698; G06V 30/19173; G06V 30/194; G06T 5/50; G06T 5/70; G06T 2207/10016; G06T 2207/20224; G06T 7/0008; G06T 2207/30128; G06T 7/215; G06T 7/246; G06T 2207/30242; G06T 7/0004; G06T 3/4046; G06T 5/60; G06T 9/002;
(Continued)

(56) References Cited

U.S. PATENT DOCUMENTS

| | | | | |
|---|---|---|---|---|
| 10,474,987 | B2 * | 11/2019 | Corona | .................... G06F 18/24 |
| 11,156,970 | B2 * | 10/2021 | Abdoo | .................... G05B 15/02 |
| 12,189,351 | B2 * | 1/2025 | Abdoo | .................... G05B 15/02 |
| 2016/0088262 | A1 | 3/2016 | Lee et al. | |
| 2016/0217417 | A1 * | 7/2016 | Ma | ........................ G06Q 10/087 |
| 2020/0363125 | A1 * | 11/2020 | Uchida | ................. F25D 29/005 |
| 2021/0166266 | A1 * | 6/2021 | Im | .............................. G06T 7/11 |

(Continued)

FOREIGN PATENT DOCUMENTS

| | | | | | |
|---|---|---|---|---|---|
| CN | 106123479 | A | * | 11/2016 | .......... F25D 29/003 |
| CN | 111444880 | A | * | 7/2020 | ............. G06F 18/24 |

(Continued)

*Primary Examiner* — Jose L Couso
(74) *Attorney, Agent, or Firm* — Dority & Manning, P.A.

(57) ABSTRACT

A video captured by a camera assembly of a household appliance includes a plurality of frames. Methods of analyzing the video may include calculating a plurality of median frames of the video, determining an area of one of the plurality of frames contains an object of interest, and isolating the determined area for analysis of the object of interest. Methods of analyzing the video may include identifying an object of interest in a minimum number of consecutive frames of the video, determining a motion vector of the object of interest based on the consecutive frames of the video, and comparing the motion vector with predetermined in and out vectors to determine whether the object of interest was added to or removed from the household appliance. Such methods may also include adding or removing the object of interest to or from a virtual inventory of the household appliance.

10 Claims, 12 Drawing Sheets

(52) U.S. Cl.
CPC .... *G06V 20/48* (2022.01); *G06T 2207/10016* (2013.01); *G06T 2207/20224* (2013.01)

(58) Field of Classification Search
CPC ........... G06T 2207/20076; G06T 2207/20081; G06T 2207/20084; F25D 2500/06; F25D 2700/04; F25D 2700/06; G05B 19/042; G05B 19/2654; G06Q 10/087; H04L 2012/285; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/214; G06F 18/22; G06F 18/241; G06F 18/24; G06F 18/2411; G06F 18/2415; G06F 30/27; Y10S 128/925

See application file for complete search history.

(56) References Cited

U.S. PATENT DOCUMENTS

| | | | | |
|---|---|---|---|---|
| 2022/0155007 | A1 | | 5/2022 | Morris et al. |
| 2023/0079388 | A1 * | | 3/2023 | Fisher ...................... G06T 3/60 |
| | | | | 382/103 |
| 2023/0332825 | A1 * | | 10/2023 | Park ..................... F25D 29/005 |
| 2024/0193497 | A1 * | | 6/2024 | Morales Saiki ..... G06V 40/178 |

FOREIGN PATENT DOCUMENTS

| | | | | |
|---|---|---|---|---|
| CN | 111462190 | A | 7/2020 | |
| CN | 111503991 | A * | 8/2020 | ............. G06V 20/00 |
| CN | 111503991 | B | 10/2021 | |
| CN | 116057337 | A * | 5/2023 | ............. G06V 20/52 |
| EP | 2995893 | A2 * | 3/2016 | ............. F25D 29/00 |
| KR | 102334350 | B1 | 12/2021 | |
| KR | 20230099452 | A * | 7/2023 | ........... G06T 7/0008 |

* cited by examiner

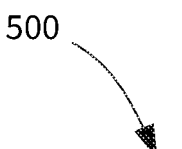
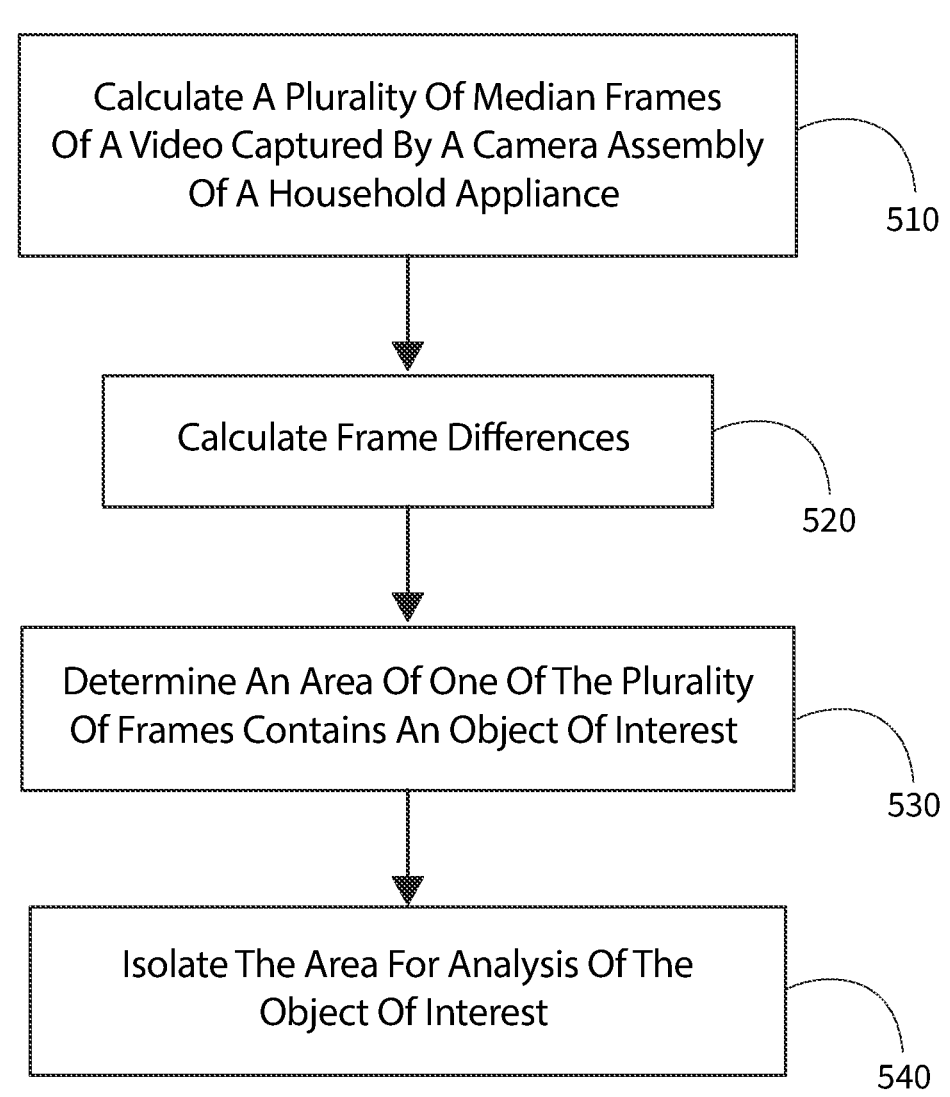
500
Calculate A Plurality Of Median Frames Of A Video Captured By A Camera Assembly Of A Household Appliance
510
Calculate Frame Differences
520
Determine An Area Of One Of The Plurality Of Frames Contains An Object Of Interest
530
Isolate The Area For Analysis Of The Object Of Interest
540
FIG. 5

600

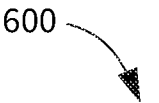

Identify An Object Of Interest In A Minimum Number Of Consecutive Frames Of A Video Captured By A Camera Assembly Of A Household Appliance

610

Determine A Motion Vector Of The Object Of Interest Based On The Consecutive Frames Of The Video

620

Compare The Motion Vector With The Predetermined In And Out Vectors To Determine Whether The Object Of Interest Was Added To Or Removed From The Household Appliance

630

Update A Virtual Inventory Of The Household Appliance In Response To Determining Whether The Object Of Interest Was Added To Or Removed From The Household Appliance

HOUSEHOLD APPLIANCE VIDEO ANALYSIS

FIELD OF THE INVENTION

The present subject matter relates generally to household appliances, such as refrigerator appliances, and more particularly to systems and methods for analyzing videos captured by such appliances.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, an oven, etc., along with other various appliances. Some household appliances may include imaging systems or camera assemblies which capture various images, e.g., still images and/or video in and around the appliance. For example, such systems may be used to identify and track objects added to or removed from the appliance, such as food items in a refrigerator appliance or oven appliance, or laundry articles in a washing machine appliance or dryer appliance.

Videos captured by such household appliances generally include background information, such as parts of the appliance itself or static objects, in addition to the object(s) of interest, e.g., food items or laundry articles, that are moved within, into, or out of the household appliance. The background information may not be pertinent, e.g., to inventory identification or tracking analysis, and analyzing such background information may increase the time, processing resources, and complexity of analyzing the video.

Accordingly, improved methods of analyzing videos captured by household appliances would be useful.

BRIEF DESCRIPTION OF THE INVENTION

Aspects and advantages of the invention will be set forth in part in the following description, or may be apparent from the description, or may be learned through practice of the invention.

In an exemplary embodiment, a method of analyzing a video captured by a camera assembly of a household appliance is provided. The video includes a plurality of frames. The method includes calculating a plurality of median frames of the video. Each median frame is a median frame for a predetermined number of frames of the plurality of frames. The method also includes calculating frame differences and determining an area of one of the plurality of frames contains an object of interest. The method further includes isolating the determined area for analysis of the object of interest.

In another exemplary embodiment, a method of analyzing a video captured by a camera assembly of a household appliance is provided. The video includes a plurality of frames. The method includes identifying an object of interest in a minimum number of consecutive frames of the video and determining a motion vector of the object of interest based on the consecutive frames of the video. The method further includes comparing the motion vector with predetermined in and out vectors to determine whether the object of interest was added to or removed from the household appliance. The method also includes adding the object of interest to a virtual inventory of the household appliance in response to determining the object of interest was added to the household appliance or removing the object of interest from the virtual inventory in response to determining the object of interest was removed from the household appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 5 provides a flow diagram of an exemplary method for operating a refrigerator appliance according to one or more exemplary embodiments of the present subject matter.

FIG. 6 provides a flow diagram of another exemplary method for operating a refrigerator appliance according to one or more additional exemplary embodiments of the present subject matter.

DETAILED DESCRIPTION

Figure 1:
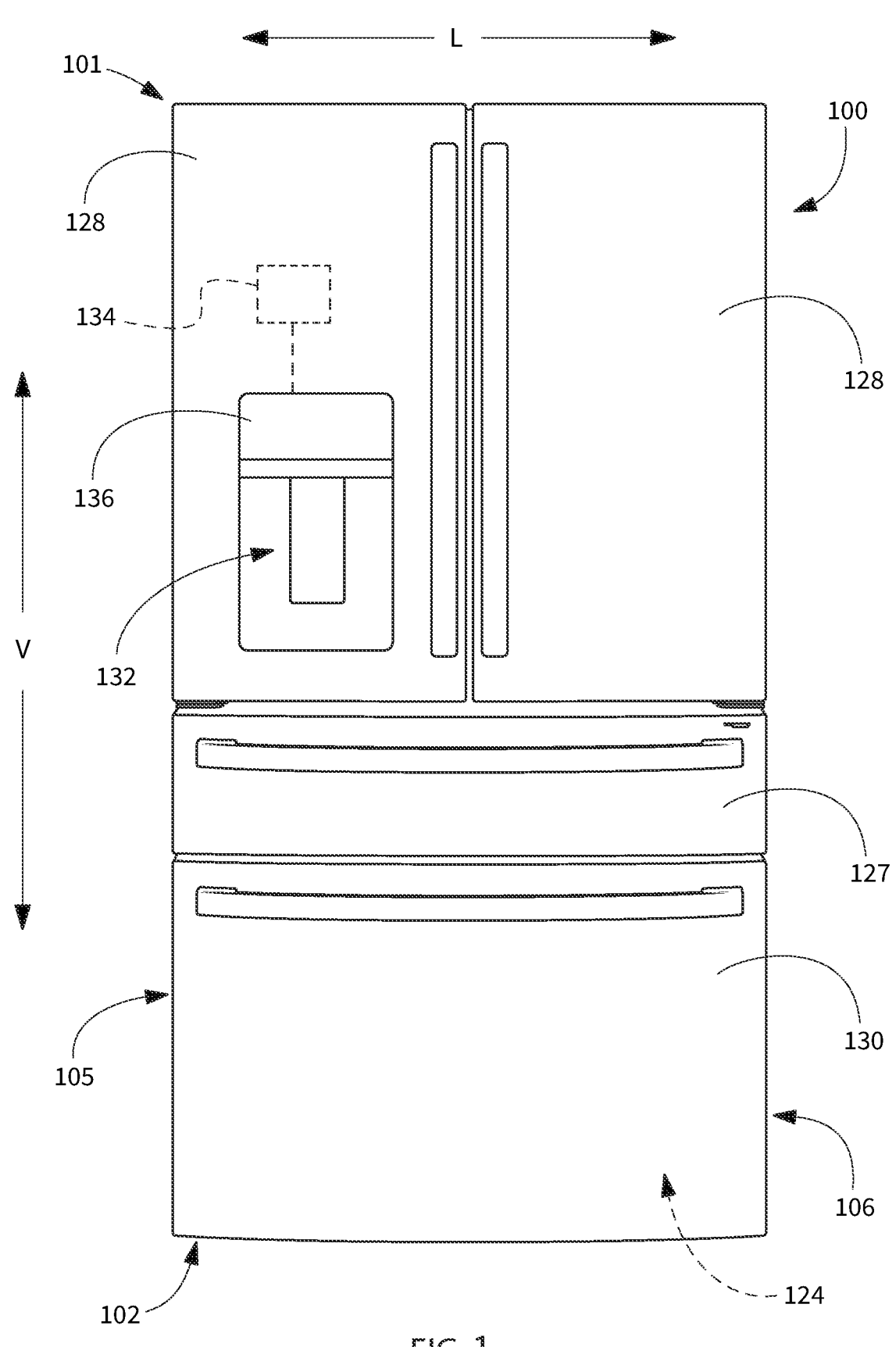
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
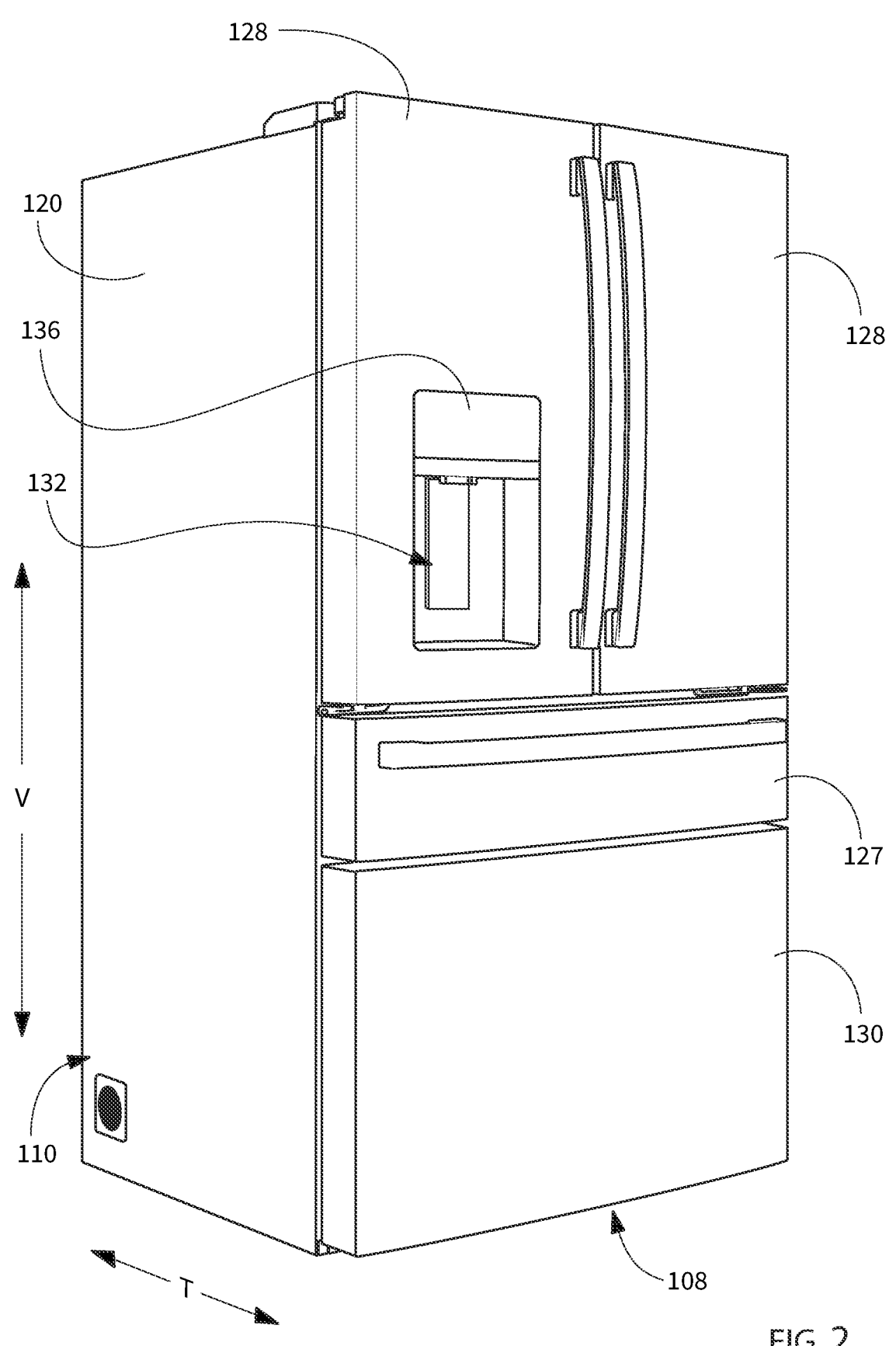
FIG. 2 provides a perspective view of the refrigerator appliance of FIG. 1.
Figure 3:
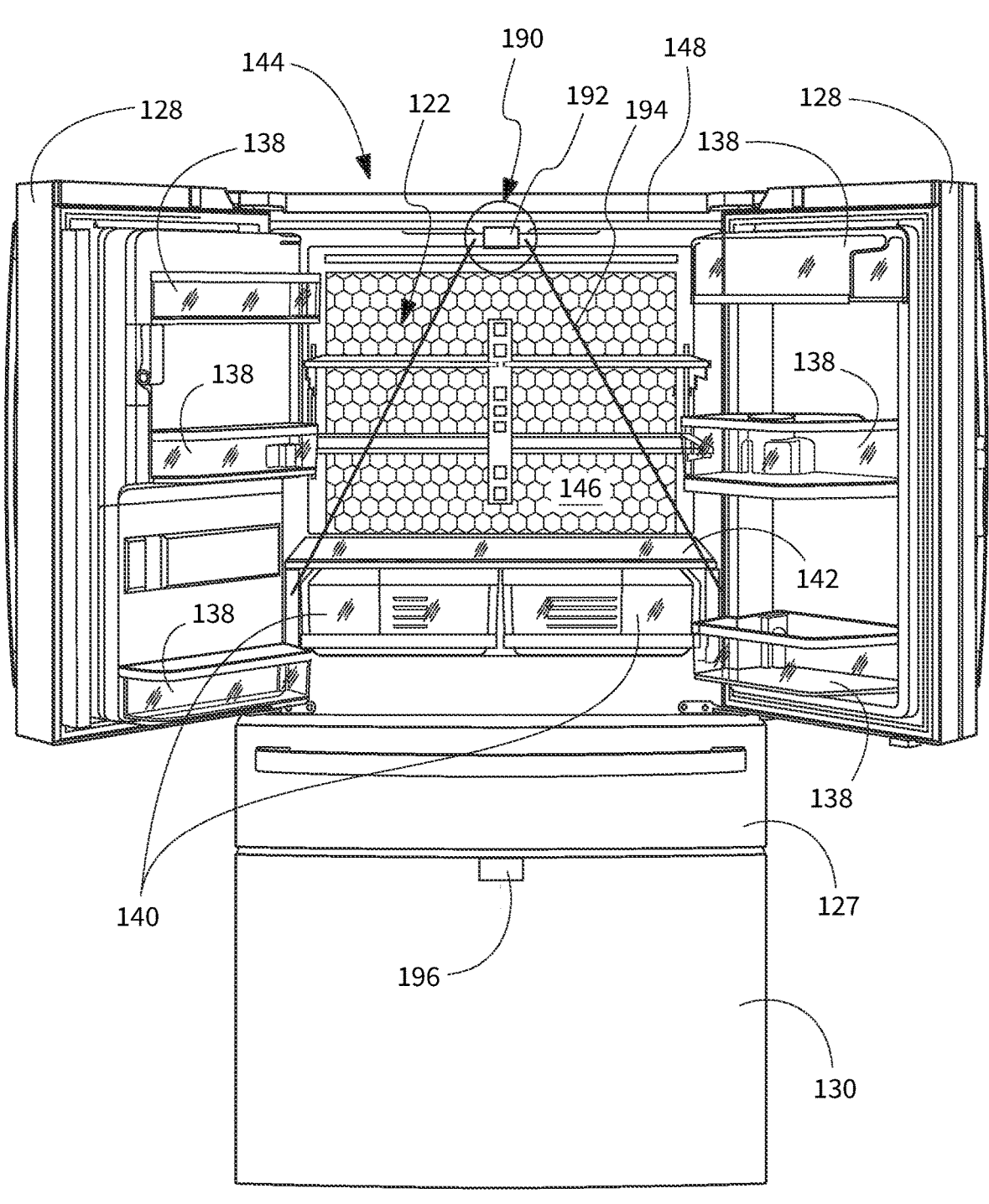
FIG. 3 provides a front view of the refrigerator appliance of FIG. 1 with doors thereof in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V and L. Refrigerator appliance 100 extends along the transverse direction T between a front portion 108 and a back portion 110.

Directional terms such as "left" and "right" are used herein with reference to the perspective of a user standing in front of the refrigerator appliance 100 to access the refrigerator and/or items stored therein. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

Refrigerator appliance 100 includes a cabinet or housing 120 defining an upper fresh food chamber 122 (FIG. 3) and a lower freezer chamber or frozen food storage chamber 124 arranged below the fresh food chamber 122 along the vertical direction V. As may be seen in FIGS. 3 and 4, a plurality of food storage elements, such as bins 138, shelves 142, and drawers 140 are disposed within the fresh food chamber 122. In some embodiments, an auxiliary food storage chamber (not shown) may be positioned between the fresh food chamber 122 and the freezer chamber 124, e.g., along the vertical direction V. Because the freezer chamber 124 is positioned below the fresh food chamber 122, refrigerator appliance 100 is generally referred to as a bottom mount refrigerator. In the exemplary embodiment, housing 120 also defines a mechanical compartment (not shown) for receipt of a sealed cooling system (not shown). Using the teachings disclosed herein, one skill in the art will understand that the present invention can be used with other types of refrigerators (e.g., side-by-sides, such as the exemplary side-by-side configuration illustrated in FIG. 4) as well. Consequently, the description set forth herein is for illustrative purposes only and is not intended to limit the invention in any aspect.

Figure 4:
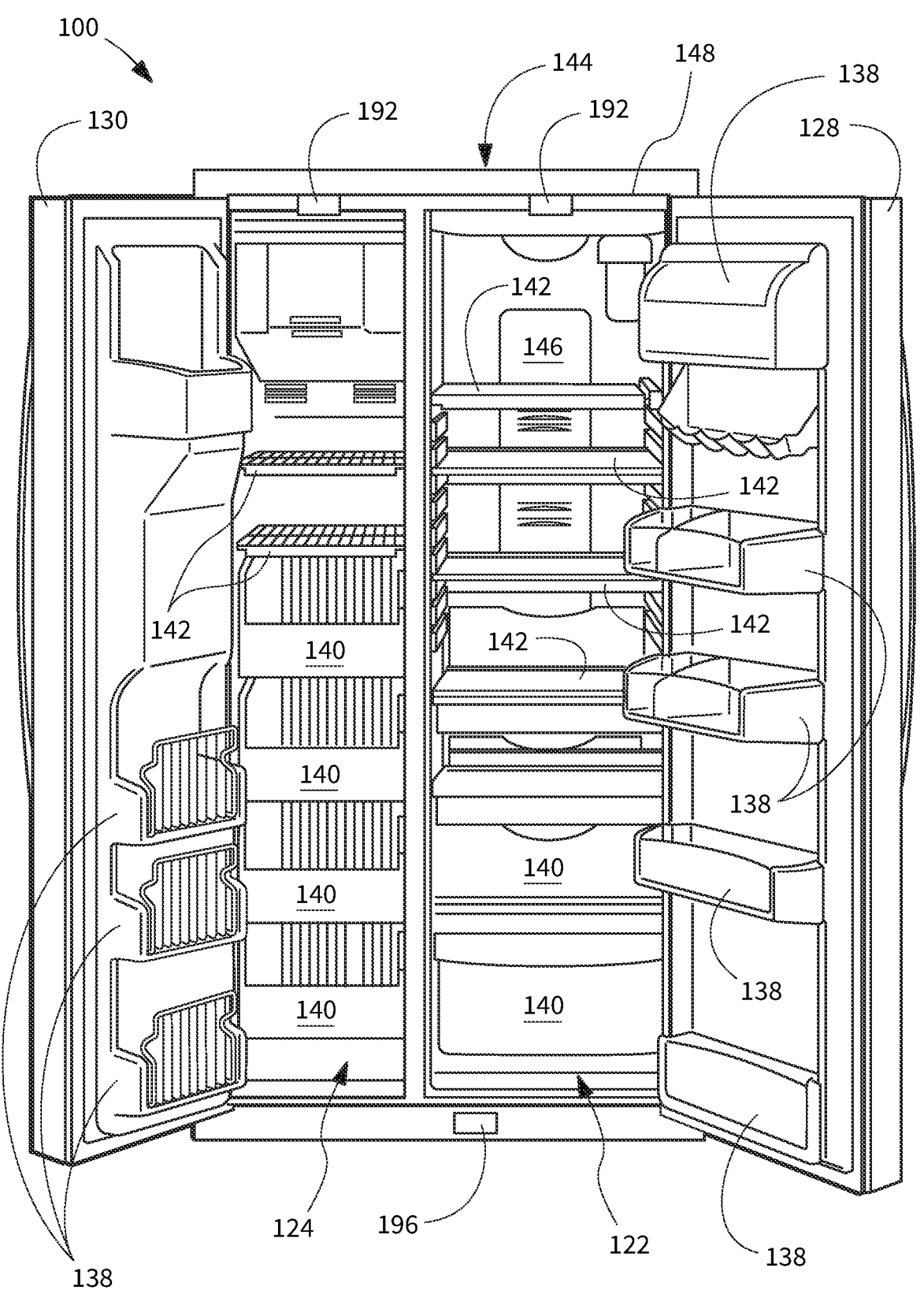
FIG. 4 provides a front view of another exemplary refrigerator appliance with doors thereof in an open position according to one or more additional exemplary embodiments of the present subject matter.

Refrigerator doors 128 are each rotatably hinged to an edge of housing 120 for accessing fresh food chamber 122. As may be seen in FIGS. 3 and 4, the fresh food chamber 122 extends along the transverse direction T between a front portion 144 and a back portion 146. The front portion 144 of the fresh food chamber 122 defines an opening 148 for receipt of food items. Refrigerator doors 128 are rotatably mounted, e.g., hinged, to an edge of housing 120 for selectively accessing fresh food chamber 122. Refrigerator doors 128 may be mounted to the housing 120 at or near the front portion 144 of the fresh food chamber 122 such that the doors 128 rotate between a closed position (FIGS. 1 and 2) where the doors 128 cooperatively sealingly enclose the fresh food chamber 122 and an open position (FIGS. 3 and 4) to permit access to the fresh food chamber 122. It should be noted that while two doors 128 in a "French door" configuration are illustrated in FIG. 3, any suitable arrangement of doors utilizing one, two or more doors is within the scope and spirit of the present disclosure, such as a single door 128 at the fresh food chamber 122 as illustrated in FIG. 4. A freezer door 130 for accessing freezer chamber 124 is arranged below refrigerator doors 128 in some embodiments, e.g., as illustrated in FIG. 3, or beside refrigerator door 128 in some embodiments, e.g., as illustrated in FIG. 4, or may also be located in other arrangements, e.g., above refrigerator door(s) 128. In the exemplary embodiment illustrated in FIG. 3, freezer door 130 is coupled to a freezer drawer (not shown) slidably mounted within freezer chamber 124, while the exemplary freezer door 130 in the embodiment illustrated in FIG. 4 is rotatable coupled to the cabinet 120. An auxiliary door 127 may be coupled to an auxiliary drawer (not shown) which is slidably mounted within the auxiliary chamber (not shown).

Operation of the refrigerator appliance 100 can be regulated by a controller 134 that is operatively coupled to a user interface panel 136. User interface panel 136 provides selections for user manipulation of the operation of refrigerator appliance 100 to modify environmental conditions therein, such as temperature selections, etc. In some embodiments, user interface panel 136 may be proximate a dispenser assembly 132. Panel 136 provides selections for user manipulation of the operation of refrigerator appliance 100 such as, e.g., temperature selections, selection of automatic or manual override humidity control (as described in more detail below), etc. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 may be located within the door 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface panel 136 may include input components, such as one or more of a variety of electrical, mechanical or electro-mechanical input devices including rotary dials, push buttons, and touch pads. The user interface panel 136 may include a display component, such as a digital or analog display device designed to provide operational feedback to a user. For example, the user interface panel 136 may include a touchscreen providing both input and display functionality. The user interface panel 136 may be in communication with the controller via one or more signal lines or shared communication busses.

As will be described in more detail below, refrigerator appliance 100 may further include features that are generally configured to detect or monitor objects of interest, e.g., food items, in or around the refrigerator appliance 100, such as detecting food items added to or removed from an inventory of the refrigerator appliance. More specifically, such features may include one or more sensors, e.g., cameras 192 and/or 196 (see, e.g., FIGS. 3 and 4), or other detection devices that are used to monitor the refrigerator appliance 100 and an area in front of the cabinet 120 that is contiguous with a food storage chamber, e.g., the food chamber 122 and/or freezer chamber 124, such as an area in which food items are likely to be present, e.g., an area through which the food items may travel while entering the refrigerator appliance or being removed from the refrigerator appliance. In this regard, the refrigerator appliance 100 may use data from each of these sensors or other detection devices to obtain a representation or knowledge of the identity, position, and/or other qualitative or quantitative characteristics of one or more objects of interest, such as food items.

As shown schematically in FIGS. 3 and 4, the detection system may include a camera assembly 190 that is generally positioned and configured for obtaining images of refrigerator appliance 100 and adjoining areas, e.g., in front of the refrigerator appliance 100, during operation of the camera assembly 190. For example, the camera assembly may be configured for obtaining video of the refrigerator appliance 100 and adjoining areas, such that references herein throughout to images, such as in "obtaining images," "capturing images," or "analyzing images," etc., are to be understood as including images that are frames of one or more videos.

The camera assembly 190, or each camera assembly in embodiments where more than one camera assembly is provided, may include one or more cameras. According to the illustrated embodiments in FIGS. 3 and 4, camera assembly 190 includes one or more first cameras 192 and one or more second cameras 196. First camera 192 and second camera 196 may be configured and operable to receive and record varying types of images. For example, the first camera 192 (FIG. 3) or first cameras 192 (FIG. 4) may be a photo camera or cameras, operable to receive and record or capture images based on light having wavelength(s) within the visible light spectrum, while the second camera 196 may be an infrared (IR) camera, e.g., may be operable to receive and record or capture images based on infrared light. The one or more cameras 192, 196 may be mounted to cabinet 120, to doors 128, or otherwise positioned in view of fresh food chamber 122, and/or an area in front of the cabinet 120 that is contiguous with the fresh food chamber 122. As shown in FIG. 3, a camera 192 of camera assembly 190 is mounted to cabinet 120 at the front opening 148 of fresh food chamber 122 and is oriented to have a field of view 194 directed across the front opening and/or into fresh food chamber 122 and in front of the fresh food chamber 122. As shown in FIG. 4, each camera 192 (of the two cameras 192 in this embodiment) is mounted to cabinet 120 at a respective front opening of fresh food chamber 122 and freezer chamber 124, such that each camera 192 is oriented to have a field of view 194 directed across the front opening and/or into each respective food storage chamber and in front of the fresh food chamber 122 and freezer chamber 124. The structure and operation of cameras are understood by those of ordinary skill in the art and, as such, the camera is not specifically illustrated or described in further detail herein for the sake of brevity and clarity.

Although a single camera 192 is illustrated in FIG. 3, it should be appreciated that camera assembly 190 may include a plurality of cameras 192 positioned within cabinet 120, wherein each of the plurality of cameras 192 has a specified monitoring zone or range positioned in and/or around refrigerator appliance 100, such as multiple cameras in one or both of the fresh food chamber 122 and the freezer chamber 124. In this regard, for example, the field of view 194 of each camera 192 may be limited to or focused on a specific area. For instance, in the exemplary embodiment illustrated in FIG. 4, the exemplary side-by-side configuration includes one camera 192 for each of the fresh food chamber 122 and the freezer chamber 124.

In some embodiments, it may be desirable to activate the visible light camera or cameras 192 for limited time durations and only in response to certain triggers. For example, the IR camera, e.g., second camera 196, may be always on and may serve as a proximity sensor, such that the photo camera(s) 192 are only activated after the IR camera 196 detects motion at the front of the refrigerator appliance 100. In additional embodiments, the activation of the first camera(s) 192 may be in response to a door opening, such as detecting that the door was opened using a door switch. In this manner, privacy concerns related to obtaining images of the user of the refrigerator appliance 100 may be mitigated. According to exemplary embodiments, camera assembly 190 may be used to facilitate an object detection and/or identification process for refrigerator appliance 100. As such, each camera 192 may be positioned at the front opening 148 to fresh food chamber 122 to monitor one or more doors 128 and/or 130 and adjoining areas, such as while food items are being added to or removed from fresh food chamber 122 and/or freezer chamber 124.

It should be appreciated that according to alternative embodiments, camera assembly 190 may include any suitable number, type, size, and configuration of camera(s) 192 for obtaining images of any suitable areas or regions within or around refrigerator appliance 100. In addition, it should be appreciated that each camera 192 may include features for adjusting the field of view and/or orientation.

It should be appreciated that the images obtained by camera assembly 190 may vary in number, frequency, angle, resolution, detail, etc. in order to improve the clarity of the particular regions surrounding or within refrigerator appliance 100. In addition, according to exemplary embodiments, controller 134 may be configured for illuminating the chilled chamber (e.g., one or both of fresh food chamber 122 and freezer chamber 124) using one or more light sources prior to obtaining images. Notably, controller 134 of refrigerator appliance 100 (or any other suitable dedicated controller) may be communicatively coupled to camera assembly 190 and may be programmed or configured for analyzing the images obtained by camera assembly 190, e.g., in order to detect and/or identify a objects of interest in or proximate to the refrigerator appliance 100, as described in more detail below.

In general, controller 134 may be operably coupled to camera assembly 190 for analyzing one or more images obtained by camera assembly 190 to extract useful information regarding objects or people within the field of view of the one or more cameras 192 and/or 196. Notably, this analysis may be performed locally (e.g., on controller 134) or may be transmitted to a remote server (e.g., in the "cloud," as those of ordinary skill in the art will recognize as referring to a remote server or database in a distributed computing environment including at least one remote computing device) for analysis. Such analysis is intended to facilitate detection of food items or other objects of interest, e.g., by identifying food items added to or removed from the fresh food chamber 122 and/or freezer chamber 124.

Specifically, according to an exemplary embodiment as illustrated in FIG. 3, camera 192 (or multiple cameras 192 in the camera assembly 190 collectively) may be oriented down from a top center of cabinet 120 and define a field of view 194 (e.g., as shown schematically in FIG. 3) that covers a width of fresh food chamber 122. In this manner, the field of view 194 of camera 192, and the resulting images obtained, may capture any motion or movement of an object (e.g., food item) placed into and/or out of the fresh food chamber 122 and/or freezer chamber 124. The images obtained by camera assembly 190 may include one or more still images, one or more video clips, or any other suitable type and number of images suitable for detection and/or identification of an object of interest, e.g., a food item.

Notably, camera assembly 190 may obtain images upon any suitable trigger, such as a time-based imaging schedule where camera assembly 190 periodically images and monitors the field of view, e.g., in and/or in front of the refrigerator appliance 100. According to still other embodiments, camera assembly 190 may periodically take low-resolution images until motion (such as opening of one or more doors 128 or 130) is detected (e.g., via image differentiation of low-resolution images), at which time one or more high-resolution images may be obtained. According to still other embodiments, refrigerator appliance 100 may include one or more motion sensors (e.g., optical, acoustic, electromagnetic, etc.) that are triggered when an object or user moves into or through the area in front of the refrigerator appliance 100, and camera assembly 190 may be operably coupled to such motion sensors to obtain images of the object during such movement.

It should be appreciated that the images obtained by camera assembly 190 may vary in number, frequency, angle, resolution, detail, etc. in order to improve the clarity thereof. In addition, according to exemplary embodiments, controller 134 may be configured for illuminating a refrigerator light (not shown) while obtaining the image or images. Other suitable imaging triggers are possible and within the scope of the present subject matter.

Using the teachings disclosed herein, one of skill in the art will understand that the present subject matter can be used with other types of refrigerators such as a refrigerator/freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

Now that the construction and configuration of refrigerator appliance 100 have been presented according to an exemplary embodiment of the present subject matter, exemplary methods for operating a refrigerator appliance, such as refrigerator appliance 100, are provided. In this regard, for example, controller 134 may be configured for implementing one or more of the following exemplary methods. However, it should be appreciated that the exemplary methods are discussed herein only to describe exemplary aspects of the present subject matter, and are not intended to be limiting.

In some embodiments, the controller 134 of the refrigerator appliance 100 may be configured for image-based processing, e.g., to detect a food item based on an image or series of images (e.g., video) of the food item (or other object of interest) taken with the camera(s) 192 of the camera assembly 190. For example, controller 134 of refrigerator appliance 100 (or any other suitable dedicated controller) may be communicatively coupled to camera assembly 190 and may be programmed or configured for analyzing the images obtained by camera assembly 190, e.g., in order to detect objects of interest in or around a refrigerator appliance 100, such as food items in the refrigerator appliance 100.

In some exemplary embodiments, the method 500 may include analyzing one or more images to detect an object of interest. It should be appreciated that this analysis may utilize any suitable image analysis techniques, image decomposition, image segmentation, image processing, etc. This analysis may be performed entirely by controller 134, may be offloaded to a remote server (e.g., in the cloud) for analysis, may be analyzed with user assistance (e.g., via user interface panel 136), or may be analyzed in any other suitable manner. According to exemplary embodiments of the present subject matter, the analysis may include a machine learning image recognition process.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor refrigerator appliance 100 and/or a proximate and contiguous area in front of the fresh food chamber 122 and/or freezer chamber 124. It should be appreciated that this image analysis or processing may be performed locally (e.g., by controller 134) or remotely (e.g., by offloading image data to a remote server or network, e.g., in the cloud).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance. For example, image differentiation may be used to determine when a pixel level motion metric passes a predetermined motion threshold.

The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image. In addition, or alternatively, the image processing algorithms may use other suitable techniques for recognizing or identifying particular items or objects, such as edge matching, divide-and-conquer searching, greyscale matching, histograms of receptive field responses, or another suitable routine (e.g., executed at the controller 134 based on one or more captured images from one or more cameras). Other image processing techniques are possible and within the scope of the present subject matter.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking. R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information-image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the property map at one or more convolution layers instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Turning now to FIG. 5, embodiments of the present disclosure may include a method 500 of analyzing a video captured by a camera assembly of a household appliance, such as the exemplary refrigerator appliance 100 and camera assemblies thereof described above. For example, the video captured by the camera assembly may include a plurality of frames. As shown in FIG. 5, method 500 includes, at step 510, calculating a plurality of median frames of the video. In some embodiments, each median frame is a median frame for a predetermined number of frames of the plurality of frames, such as a median frame for every N number of frames.

Method 500 may further include calculating frame differences, e.g., as indicated at 520 in FIG. 5. For example, calculating frame differences may include subtracting each of the predetermined number of frames from the respective median frame. That is, where the predetermined number of frames is N, each of the N frames in the set of frame may be subtracted from the median frame calculated in step 510 for that set of N frames of the video.

Also as may be seen in FIG. 5, method 500 may include a step 530 of determining that an area of one of the plurality of frames contains an object of interest, and a step 540 of isolating the determined area, i.e., isolating the area of the frame which was determined to include or contain the object of interest, for analysis of the object of interest. The object of interest may be, for example, a food item. In some embodiments, isolating the determined area for analysis of the object of interest may include transmitting the determined area to an artificial intelligence ("AI") model for object classification and location. Isolating the area may also include defining a box around the area of the frame including the object of interest. The box may be defined, for example, based on X and Y coordinates within the frame. Thus, in such embodiments, a size, e.g., area, of the box may be calculated using the formula: A=dXdY; where A is the area of the box, dX is the difference between the first and last X coordinates of the box, and dY is the difference between the first and last Y coordinates of the box. As will be described in further detail below, motion in the frame may be detected based on the area of the box, such as by comparing the area to an area threshold.

In some embodiments, methods according to the present disclosure, such as the exemplary method 500 of FIG. 5, may also include creating a subtracted image from each of the predetermined number of frames and the respective median frame based on the calculated frame differences. The subtracted image may thus eliminate background elements which are present across multiple frames, such as present in all of the N frames. Such background elements may include, for example, static elements such as internal walls of the food storage chamber and movable elements such as doors and drawers. Accordingly, the subtracted image may eliminate or reduce the presence of background elements as compared to the original frame(s) of the video, and may highlight or include objects of interest, such as a food item or items.

Additionally, using multiple median frames may more effectively remove movable background elements, e.g., doors and drawers, as compared to a single median frame for the video. For example, a first median frame of the plurality of median frames which is calculated for a first set of N frames may include the door in a closed position, whereas a second median frame of the plurality of median frames which is calculated for a second set of N frames may include the door in an open position. Thus, the closed door may be removed from subtracted images calculated from frames in the first set of N frames in which the door is closed, and the open door may be removed from subtracted images calculated from frames in the second set of N frames in which the door is open, whereas the door would only be removed in subtracted images calculated from frames depicting the door in a single position if only one median frame were provided, where the single position would be whichever position the door is in in the only one median frame, such as the closed position. Thus, by providing a plurality of median frames, the door (or other movable background element) may be removed from a larger number of the subtracted images.

In some example embodiments, methods according to the present disclosure, such as the exemplary method 500 of FIG. 5, may further include creating a smoothed mask from the subtracted image. Such embodiments may also include comparing a masked portion of the smoothed mask to a predetermined area threshold. In such embodiments, determining that the area of one of the plurality of frames contains the object of interest may include determining the masked portion is greater than the predetermined area threshold. When a substantial area is masked, e.g., if the masked portion is greater than the predetermined area threshold, the substantial masked area indicates motion, e.g., a significant change from one frame to the next and/or a significant change from the median frame. Thus, the image, e.g., frame, may be subjected to further image processing and/or analysis, such as using an AI model, e.g., as described above, for example, the portion of the image containing the object(s) of interest may be analyzed using an AI model. Such image processing and/or analysis may be used to identify or locate an object of interest in the frame, for example, in the portion of the frame covered by the smoothed mask. Thus, isolating the determined area for analysis of the object of interest may include isolating the masked portion of the smoothed mask applied to the subtracted image.

In some methods according to the present disclosure, such as embodiments of the method 500 of FIG. 5, the analysis of the object of interest may also include determining a motion vector of the object of interest. For example, in such embodiments, the analysis of the object of interest may also include identifying the object of interest in a minimum number of consecutive frames of the video. The motion vector may be determined based on the consecutive frames of the video, e.g., at least the minimum number of consecutive frames of the video and any additional consecutive frames in which the object of interest is identified.

Embodiments which include determining a motion vector of the object of interest may further include comparing the motion vector with a predetermined in motion vector and a predetermined out motion vector to determine whether the object of interest was added to or removed from the household appliance. For example, an average vector may be calculated for class instances, e.g., for an object of interest that is classified as a food item. When the calculated average vector is above a threshold magnitude, it may then be compared with the predetermined in vector and out vector. The predetermined in motion vector and out motion vector may be tied to the position or angle of the camera which captured the video, such as based on the field of view of the camera in relation to the opening 148 of the food storage chamber, e.g., fresh food chamber 122. Such comparison may result in determining that the calculated motion vector is aligned with, e.g., parallel to or approximately parallel to, one of the predetermined motion vectors. When the calculated motion vector is aligned or approximately aligned with the predetermined in motion vector, it may be determined therefrom that the object of interest, e.g., food item, was added to the appliance, e.g., refrigerator appliance, whereas when the calculated motion vector is aligned or approximately aligned with the predetermined out motion vector, it may be determined therefrom that the object of interest, e.g., food item, was removed from the appliance, e.g., refrigerator appliance. Accordingly, a virtual inventory of the appliance may then be updated. The virtual inventory may be stored locally, e.g., in a memory of the appliance, or remotely, e.g., in the cloud (or edge, fog, or other distributed computing environment, as well as in any other suitable remote database which may be accessed, e.g., via the internet), or both locally and remotely either in a redundant storage or divided into discrete portions.

Turning now to FIG. 6, embodiments of the present disclosure may include a method 600 of analyzing a video captured by a camera assembly of a household appliance, such as the exemplary refrigerator appliance 100 and camera assemblies thereof described above. For example, the video captured by the camera assembly may include a plurality of frames. For example, as illustrated in FIG. 6, the method 600 may include a step 610 of identifying an object of interest in a minimum number of consecutive frames of the video. Identifying the object of interest in the minimum number of consecutive frames may include identifying the object of interest, e.g., using a classification image analysis, in each of the consecutive frames. In some embodiments, the minimum number of consecutive frames may include a number of consecutive frames with no gaps, e.g., where the object(s) of interest appear(s) in each and every frame of the consecutive frames, or may include a number of consecutive frames with minimal gaps therebetween, such as where no more than ten frames which do not include the object(s) of interest are included in the consecutive frames, such as no more than five frames which do not include the object(s) of interest.

Method 600 may also include a step 620 of determining a motion vector of the object of interest based on the consecutive frames of the video. The determined motion vector may then be compared with predetermined in and out vectors to determine whether the object of interest was added to or removed from the household appliance, e.g., as indicated at 630 in FIG. 6.

Method 600 may further include a step 640 of updating a virtual inventory of the household appliance in response to determining whether the object of interest was added to or removed from the household appliance. Updating the virtual inventory may include adding the object of interest to the virtual inventory of the household appliance in response to determining the object of interest was added to the household appliance or removing the object of interest from the virtual inventory in response to determining the object of interest was removed from the household appliance. Thus, it should be recognized that the updating step 640 is performed regardless of the outcome of the determination at step 630, e.g., the updating step 640 includes adding the object when it is determined that the object was added to the refrigerator based on the motion vector, and includes removing the object when it is determined that the object was removed from the refrigerator based on the motion vector, and the comparison of the motion vector leads to either one or the other of determining the object was added to the refrigerator appliance or determining the object was removed from the refrigerator appliance.

Methods according to the present disclosure, e.g., method 600, may also include calculating a plurality of median frames of the video. For example, each median frame may be a median frame for a predetermined number of frames of the plurality of frames, e.g., a median frame may be calculated for every N frames. In such embodiments, the object of interest may be identified based on the plurality of median frames of the video. Using a plurality of median frames, e.g., as compared to a single median frame for the entire video, may more effectively remove movable background elements during processing, as described above.

For instance, some embodiments may include calculating frame differences by subtracting each of the predetermined number of frames from the respective median frame. Such embodiments may further include creating a subtracted image from each of the predetermined number of frames and the respective median frame based on the calculated frame differences. Additionally, such embodiments may include creating a smoothed mask from the subtracted image. In embodiments where a smoothed mask is created, exemplary methods may also include comparing a masked portion of the smoothed mask to a predetermined area threshold. In such embodiments, identifying the object of interest may include determining the masked portion is greater than the predetermined area threshold, and the object of interest may be depicted within the masked portion. When the masked portion is greater than the predetermined area threshold, an AI model may be called for analysis of the masked portion, such as classifying and locating the object of interest using an artificial intelligence model.

Referring now generally to FIGS. 5 and 6, the methods 500 and 600 may be interrelated and/or may have one or more steps from one of the methods 500 and 600 combined with the other method 500 or 600. Accordingly, steps, portions of steps, and other details described above with respect to either one of the methods 500 or 600 may be applied or provided in both of the methods 500 and 600. Thus, those of ordinary skill in the art will recognize that the various steps of the exemplary methods described herein may be combined in various ways to arrive at additional embodiments within the scope of the present disclosure.

Figure 7:
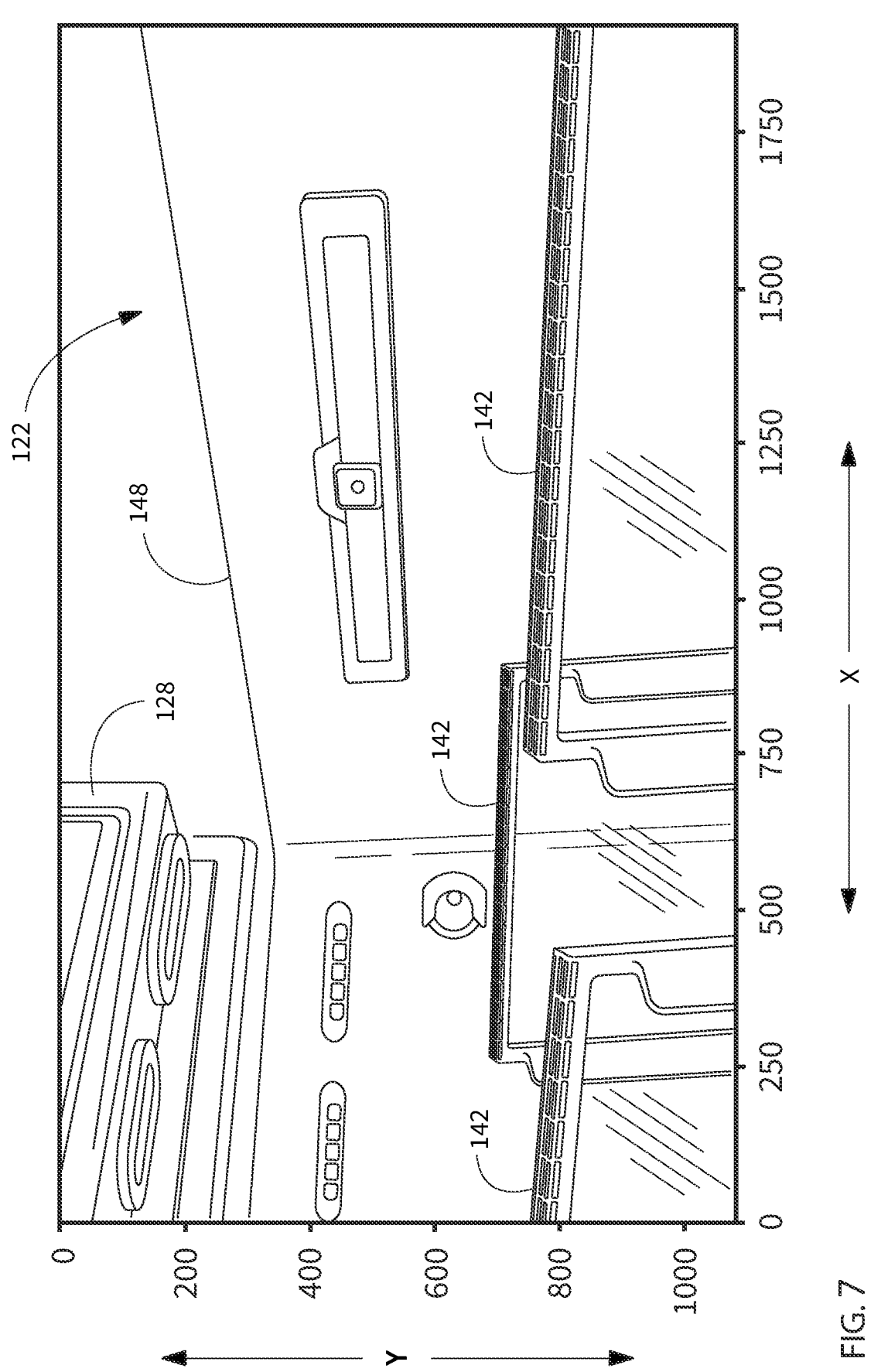
FIG. 7 illustrates an exemplary median frame according to one or more exemplary embodiments of the present subject matter.
Figure 8:
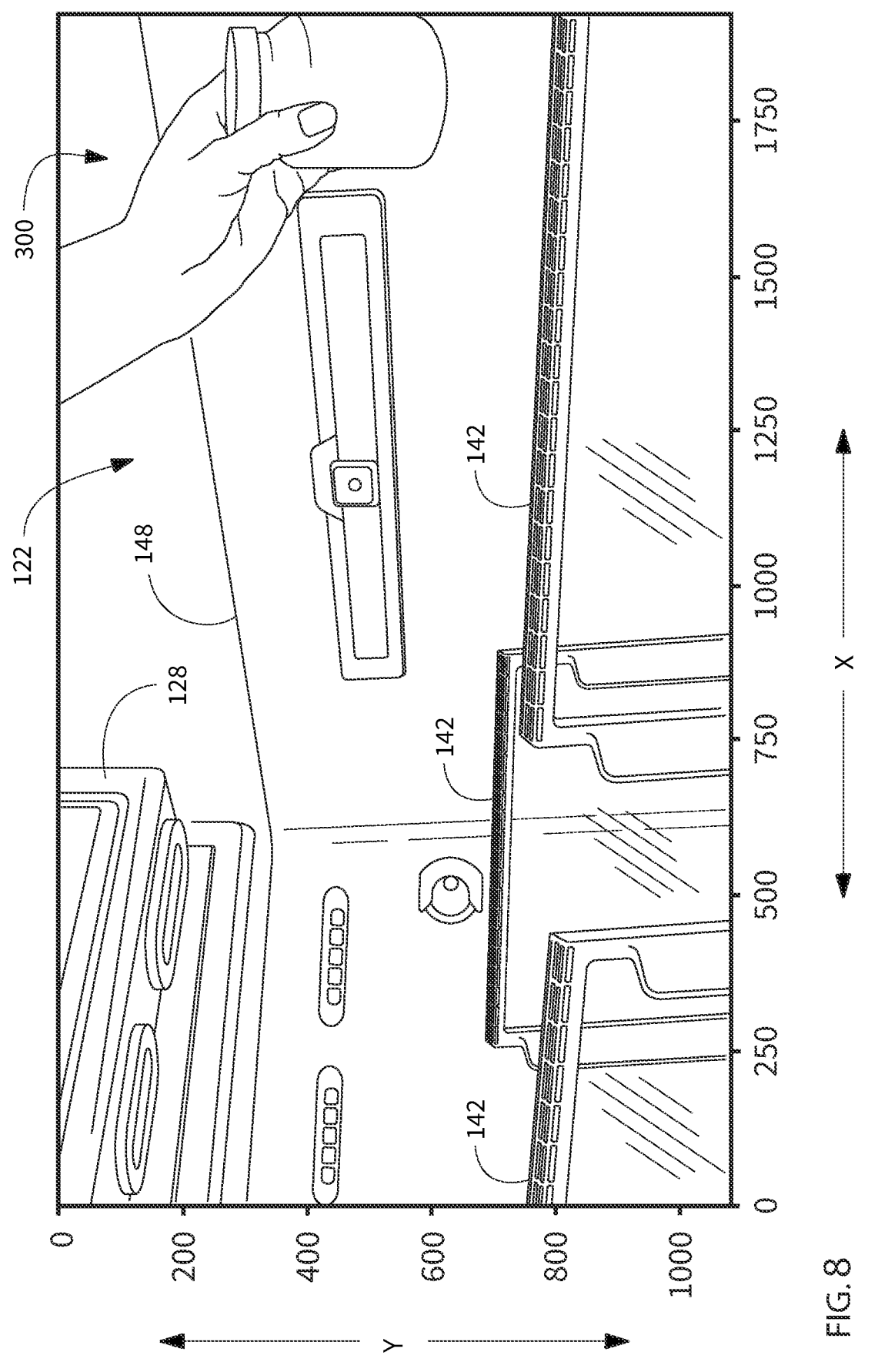
FIG. 8 illustrates an exemplary frame according to one or more exemplary embodiments of the present subject matter.

An exemplary median frame, e.g., where the appliance is a refrigerator appliance, is illustrated in FIG. 7. An exemplary frame, e.g., one of the N frames for which the median frame of FIG. 7 was calculated, is illustrated in FIG. 8. The frame of FIG. 8 is an example image which may be obtained by a bottom right camera, and the bottom right camera may be one camera of a multi-camera array, e.g., with each camera directed at a different portion of the appliance. In addition to background elements, the exemplary frame of FIG. 8 also depicts one or more objects of interest 300. As may be seen in the exemplary frame of FIG. 8 and the exemplary median frame of FIG. 7, the field of view of the exemplary bottom right camera includes a portion of a door 128 of the refrigerator appliance, a portion of the fresh food chamber 122 (including a portion of the opening 148 thereof) and portions of some of the shelves 142 in the fresh food chamber 122.

Figure 9:
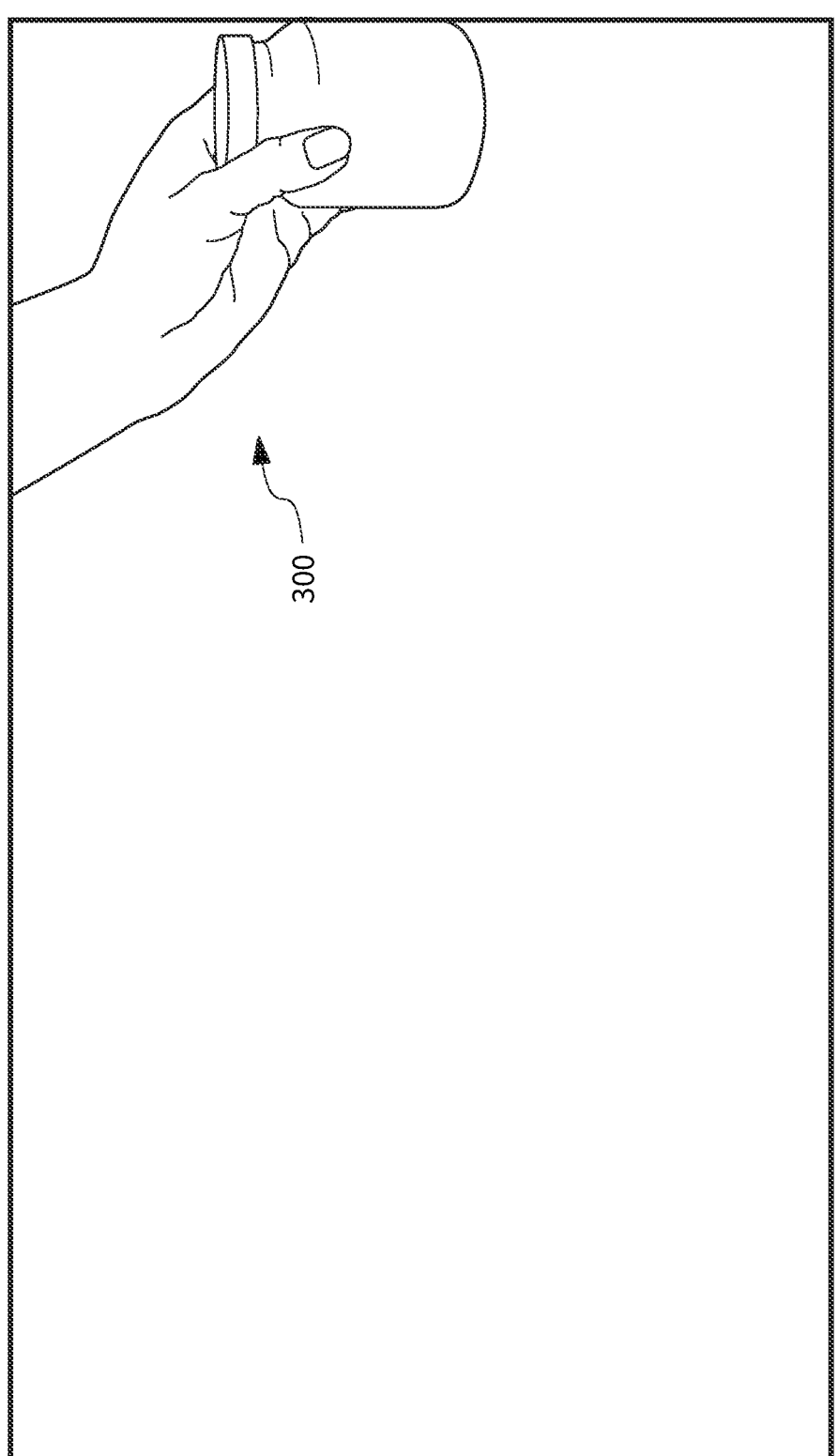
FIG. 9 illustrates an exemplary subtracted image according to one or more exemplary embodiments of the present subject matter.

An exemplary subtracted image, where all common elements of the frame of FIG. 8 and the median frame of FIG. 7 have been removed, is illustrated in FIG. 9. As may be seen in FIGS. 7 through 9, static elements such as parts of the fresh food chamber have been removed from the subtracted image of FIG. 9, as well as movable elements such as the door 128 of the refrigerator appliance. Thus, only objects of interest 300, which in this example include a user's hand and a food item, remain in the subtracted image.

Figure 10:
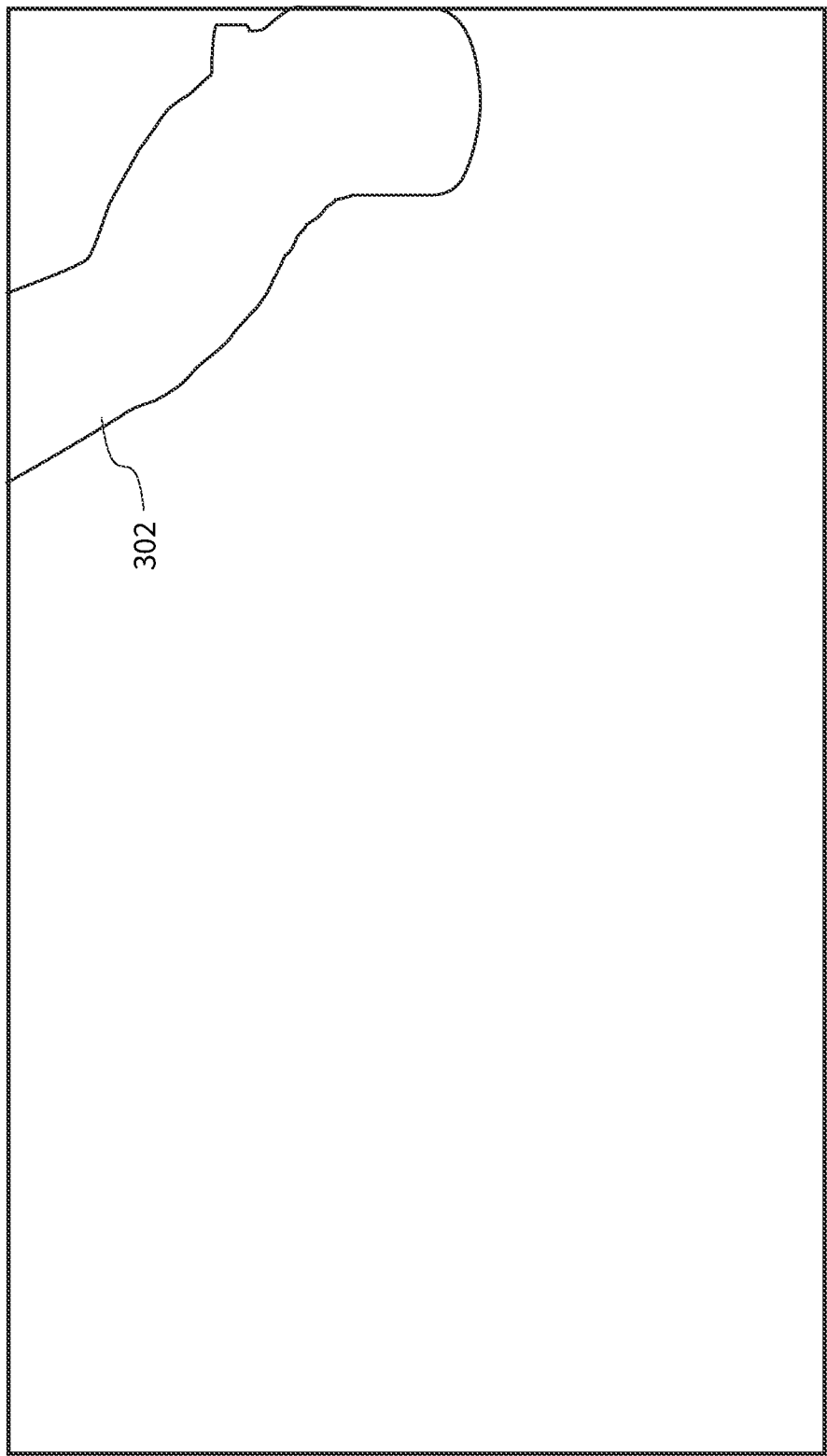
FIG. 10 illustrates a smoothed mask applied to the subtracted image of FIG. 9.
Figure 11:
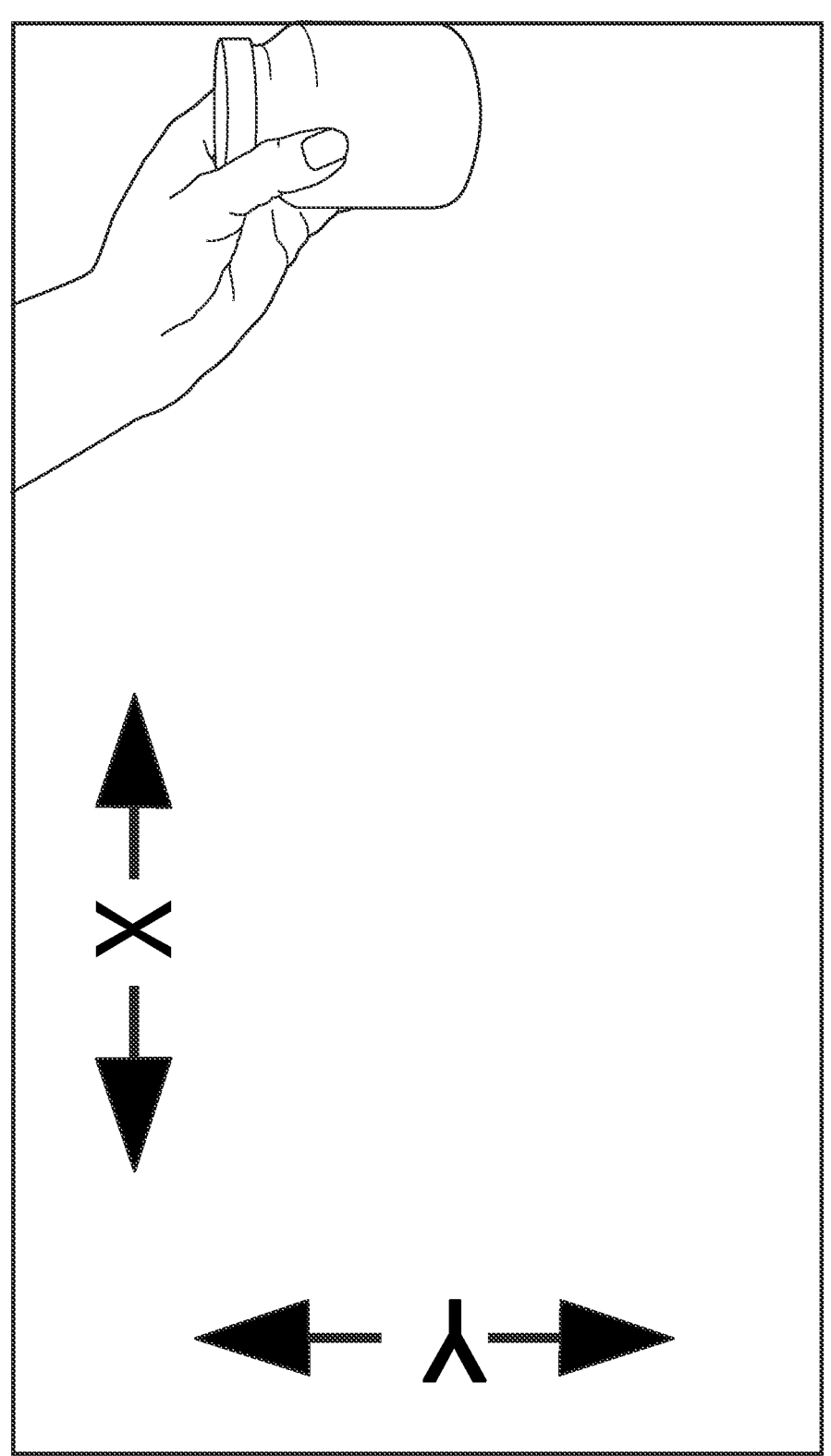
FIG. 11 illustrates a masked frame including X and Y coordinates.
Figure 12:
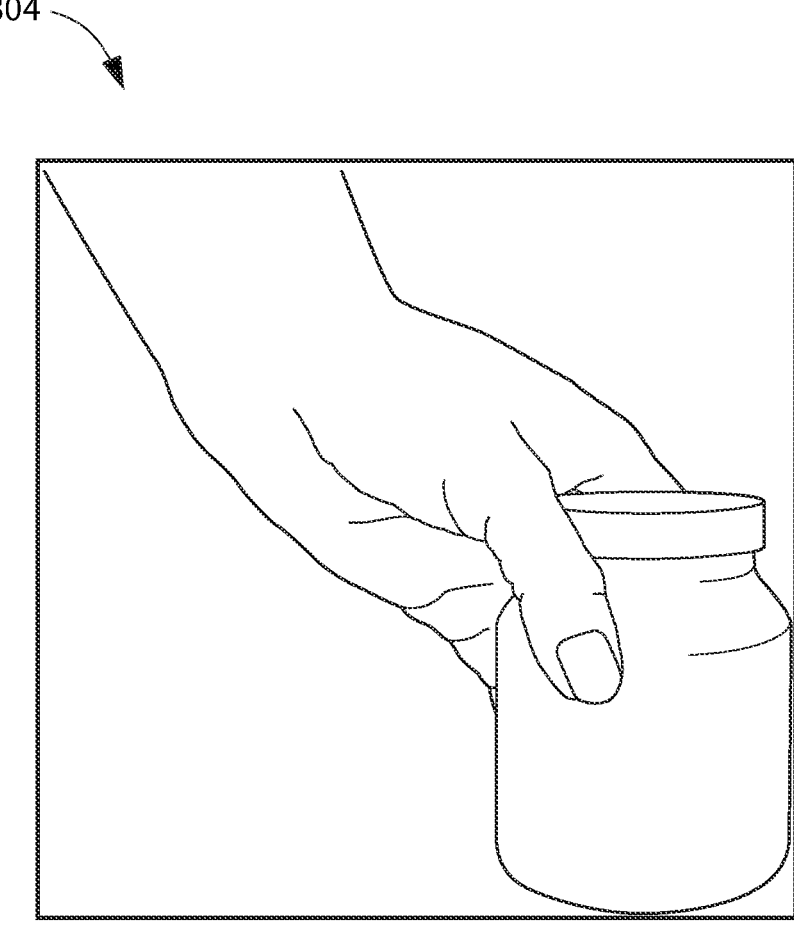
FIG. 12 illustrates an output area for analysis which may be output from the frame of FIG. 9.

FIG. 10 illustrates an exemplary smoothed mask 302 applied to the subtracted image of FIG. 9. As may be seen in FIG. 10, the smoothed mask 302 is applied to the elements of the frame which remain after subtraction, e.g., where the subtracted image of FIG. 9 does not include the background elements, only objects of interest have the mask 302 applied thereto. Thus, the size (area) of the smoothed mask 302 may correspond to or be indicative of an amount of motion in the exemplary frame (FIG. 8), such that the size of the mask may be compared to a size (area) threshold in order to determine the presence of one or more objects of interest and/or moving objects in the frame. In some embodiments, e.g., as indicated in FIGS. 7, 8, and 11, an X-Y coordinate system may be defined for the frame. As illustrated in FIG. 11, X and Y coordinates may be applied to the image in order to quantify a location and size (area) of the masked portion of the image. Example numeric values for the X and Y coordinates of the frame as a whole are provided along each axis in FIGS. 7 and 8. A box containing the object(s) of interest (i.e., containing a representation or depiction of the object(s) of interest in the image frame) may be defined in terms of the X and Y coordinates, and the area of the box may be calculated using A=dXdY, as described above. The box may be extracted or isolated, e.g., to generate an output 304 as illustrated in FIG. 12. The box output 304 of FIG. 12 which is extracted from the frame may be output to an AI model for analysis, such as object classification (e.g., which may distinguish the food item from the user's hand or may identify the food item, etc.) and location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of analyzing a video captured by a camera assembly of a household appliance, the video comprising a plurality of frames, the method comprising:
   calculating a plurality of median frames of the video, wherein each median frame is a median frame for a predetermined number of frames of the plurality of frames;
   calculating frame differences, wherein calculating frame differences comprises subtracting each of the predetermined number of frames from the respective median frame;
   creating a subtracted image from each of the predetermined number of frames and the respective median frame based on the calculated frame differences;
   creating a smoothed mask from the subtracted image;
   determining an area of one of the plurality of frames contains an object of interest; and
   isolating the determined area for analysis of the object of interest.

2. The method of claim 1, further comprising comparing a masked portion of the smoothed mask to a predetermined area threshold, and wherein determining the area of one of the plurality of frames contains the object of interest comprises determining the masked portion is greater than the predetermined area threshold.

3. The method of claim 1, wherein isolating the determined area for analysis of the object of interest comprises transmitting the determined area to an artificial intelligence model for object classification and location.

4. The method of claim 1, wherein the analysis of the object of interest comprises determining a motion vector of the object of interest.

5. The method of claim 4, further comprising comparing the motion vector with predetermined in and out vectors to determine whether the object of interest was added to or removed from the household appliance.

6. The method of claim 5, further comprising adding the object of interest to a virtual inventory of the household appliance in response to determining the object of interest was added to the household appliance or removing the object of interest from the virtual inventory in response to determining the object of interest was removed from the household appliance.

7. The method of claim 4, wherein the analysis of the object of interest further comprises identifying the object of interest in a minimum number of consecutive frames of the video, wherein the motion vector is determined based on the consecutive frames of the video.

8. A method of analyzing a video captured by a camera assembly of a household appliance, the video comprising a plurality of frames, the method comprising:
   identifying an object of interest in a minimum number of consecutive frames of the video;
   determining a motion vector of the object of interest based on the consecutive frames of the video;
   comparing the motion vector with predetermined in and out vectors to determine whether the object of interest was added to or removed from the household appliance;
   calculating a plurality of median frames of the video, wherein each median frame is a median frame for a predetermined number of frames of the plurality of frames, and wherein the object of interest is identified based on the plurality of median frames of the video;
   calculating frame differences by subtracting each of the predetermined number of frames from the respective median frame;
   creating a subtracted image from each of the predetermined number of frames and the respective median frame based on the calculated frame differences;
   creating a smoothed mask from the subtracted image; and
   updating a virtual inventory of the household appliance in response to determining whether the object of interest was added to or removed from the household appliance.

9. The method of claim 8, further comprising comparing a masked portion of the smoothed mask to a predetermined area threshold, and wherein identifying the object of interest comprises determining the masked portion is greater than the predetermined area threshold, wherein the object of interest is depicted within the masked portion.

10. The method of claim 9, further comprising classifying and locating the object of interest using an artificial intelligence model.

* * * * *